United States Patent [19]
Nied et al.

[11] Patent Number: 4,613,743
[45] Date of Patent: Sep. 23, 1986

[54] ARC WELDING ADAPTIVE PROCESS CONTROL SYSTEM

[75] Inventors: Herman A. Nied, Ballston Lake; Radhakisan S. Baheti, Schenectady, both of N.Y.

[73] Assignee: General Electric Company, Schenectady, N.Y.

[21] Appl. No.: 677,786

[22] Filed: Dec. 3, 1984

[51] Int. Cl.⁴ .............................................. B23K 9/10
[52] U.S. Cl. .......................... 219/130.21; 219/137 PS; 901/42
[58] Field of Search ...................... 219/124.34, 130.21, 219/137 PS; 901/42, 47; 364/477; 358/101

[56] References Cited

PUBLICATIONS

R. W. Richardson, et al., "A Vision Based System for Arc Weld Pool Size Control", Measurement and Control for Batch Manufacturing, ed. by D. E. Hardt, ASME, Nov. 14-19, 1982, pp. 65-75.
R. D. Richardson, et al., "The Measurement of Two-Dimensional Arc Weld Pool Geometry by Image Analysis", Control of Manufacturing Processes and Robotic Systems, ed. by D. E. Hardt & W. J. Book, ASME, Nov. 13-18, 1982, pp. 137-148.
L. M. Sweet et al., "Closed-Loop Joint Tracking, Puddle Centering and Weld Process Control Using an Integrated Weld Torch Vision System", Control of Manufacturing Processes and Robotic Systems, ed. by D. E. Hardt and W. J. Book, ASME, Nov. 13-18, 1983, pp. 97-105.
L. M. Sweet et al, "Sensors and Controls for Robotic Arc Welding", International Machine Tool Conference, Chicago, Sep. 5-13, 1984, pp. 9-54 to 9-69.

Primary Examiner—Clifford C. Shaw
Attorney, Agent, or Firm—Donald R. Campbell; James C. Davis, Jr.; Paul R. Webb, II

[57] ABSTRACT

A robotic arc welding system has an integrated vision sensor to image and analyze the weld scene in real time. The most effective weld puddle geometry discriminants for use in an adaptive feedback control, to assure full penetration welds, are weld puddle area and maximum width. The adaptive control system determines a puddle geometry error and a correction to nominal welding current to change the heat input to the weld pool, regulating a combination of puddle area and width, or only puddle area under some welding conditions, to control weld quality during the welding process. Arc voltage is modulated to reflect changes in welding current and maintain constant arc length.

12 Claims, 8 Drawing Figures

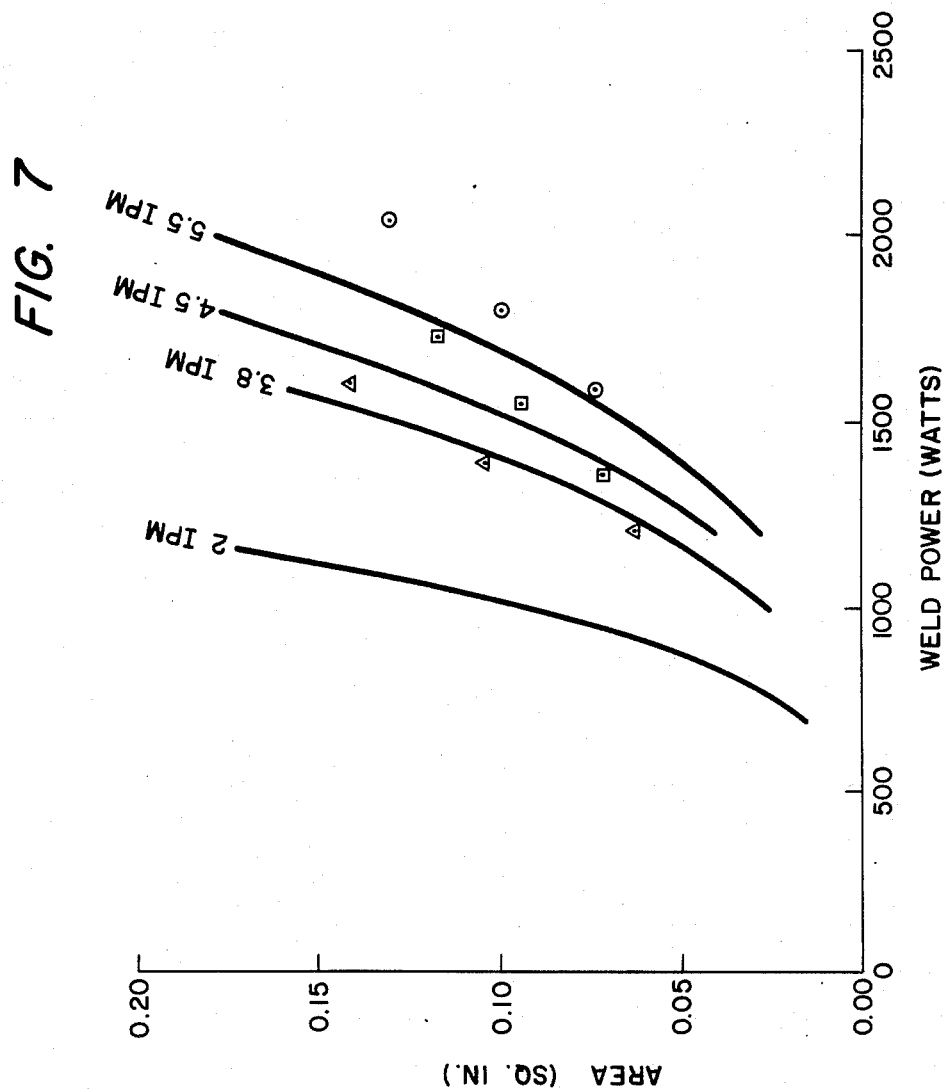

ARC WELDING ADAPTIVE PROCESS CONTROL SYSTEM

BACKGROUND OF THE INVENTION

This invention relates to a vision-based arc welding control system and method of closed-loop weld process control, and to more effective weld puddle geometry discriminants to provide quality welds with full penetration for thin sheet metal parts.

An optical viewing system integrated into a TIG (tungsten inert gas) welding torch provides direct images of the weld pool and joint as viewed axially along the torch electrode. The primary components of the vision system are a laser pattern generator, the through-torch sensor, a solid state imager, and a distributed microprocessor for real-time image analysis. A first coherent fiber optic bundle transmits laser spots to floodlight the weld puddle and a laser pattern, such as two parallel stripes, projected close to the weld puddle to determine joint location and width. A second coherent fiber optic bundle transmits the image of the weld puddle, laser stripes and surrounding weld region to the imager. The vision system analyzes the weld puddle and determines geometry parameters such as puddle dimensions and position of the puddle relative to the joint. Arc welding torches with integrated optics and other aspects of the robotic welding system are described in the assignee's patents and copending applications.

It is desirable to monitor and control the robotic welding process in real time to insure high quality welds. In many applications, variations in local metal thickness, joint width, heat sinking, and grounding geometry may lead to unacceptable errors in weld bead width penetration, and resultant seam geometry. By using vision sensors such as the foregoing that can monitor the welding process in real time, weld quality can be maintained through closed-loop process control.

Vision systems used for automating the TIG welding process have been based solely on measuring the weld puddle width in order to provide a uniform quality weld with full pentration. One of those using puddle width to control the process, developed at the Center for Welding Research, Ohio State University, is described in "A Vision Based System for Arc Weld Pool Size Control", R. W. Richardson et al, Measurement and Control for Batch Manufacturing, ed. by D.E. Hardt, ASME, November 1982, pp. 65-75. There are many disturbances in the welding process, such as variations in filler wire feed rate, which can cause a change in the weld puddle width. If the welding process parameters such as velocity and weld current are changed to control the width this does not necessarily result in the desired weld bead quality.

SUMMARY OF THE INVENTION

An object of the invention is to provide an improved vision-based arc welding control system using the most sensitive discriminants that can be measured from the weld puddle for controlling the welding process.

Another object is the provision of a multivariable feedback control system for TIG (or GTA) welding based on a combination of weld puddle measurements for controlling the welding process in real time.

Yet another object is an improved closed-loop process control method to obtain full penetration welds with proper reinforcement and drop through for thin sheet metals.

Mathematical analysis and experiments have revealed that both the weld pool area and puddle width are the best geometric discriminants to be measured for dynamic control, and yield more information to predict full penetration. Further, the measurement accuracy of area is much better than width. Both current and velocity have a substantial effect on weld pool geometry. However, current is more easily regulated and has a more direct and predictable influence on the pool heat balance.

The vision-based robotic arc welding system has an improved adaptive feedback control system to control weld quality during the welding operation and assure full penetration weld beads, while compensating for welding process disturbances such as tack welds, heat sinks, changes in filler wire feed rate, and a puddle not centered over the joint. The control system has a means to analyze the vision system image and measure puddle area and maximum width at discrete time intervals, and determine a puddle geometry error by comparing the area and width measurements with the desired area and width. It is further comprised of means to correct the nominal welding current as a function of puddle error; the error is the input to a dynamic compensator to minimize the effects of process disturbances, stabilize the feedback loop, and provide robust dynamic performance. Means are provided to feed the corrected weld current to the welding torch and thereby change the heat input to the weld puddle and the pool boundaries in real time.

The closed-loop process control method may be used under some welding conditions by measuring and regulating only the puddle area; under many welding conditions both the area and maximum width are regulated and the relative proportions are selected based on the control objective. Another feature of the system and method is that a constant arc length is maintained by modulating arc voltage to reflect changes in welding current.

This adaptive welding control system provides quality welds for autogeneous and non-autogeneous welds requiring filler wire. The adaptive control concept has been demonstrated on several robots.

BRIEF DESCRIPTION OF THE DRAWINGS

FIGS. 6 and 7 are curves comparing predicted and measured data for the relationship between puddle area and electrical power input to the welding process for different torch travel speeds, FIG. 6 for 1/16 inch thick 304 SS plates and FIG. 7 for ⅛ inch thick 304 SS plates.

DETAILED DESCRIPTION OF THE INVENTION

Figure 1:
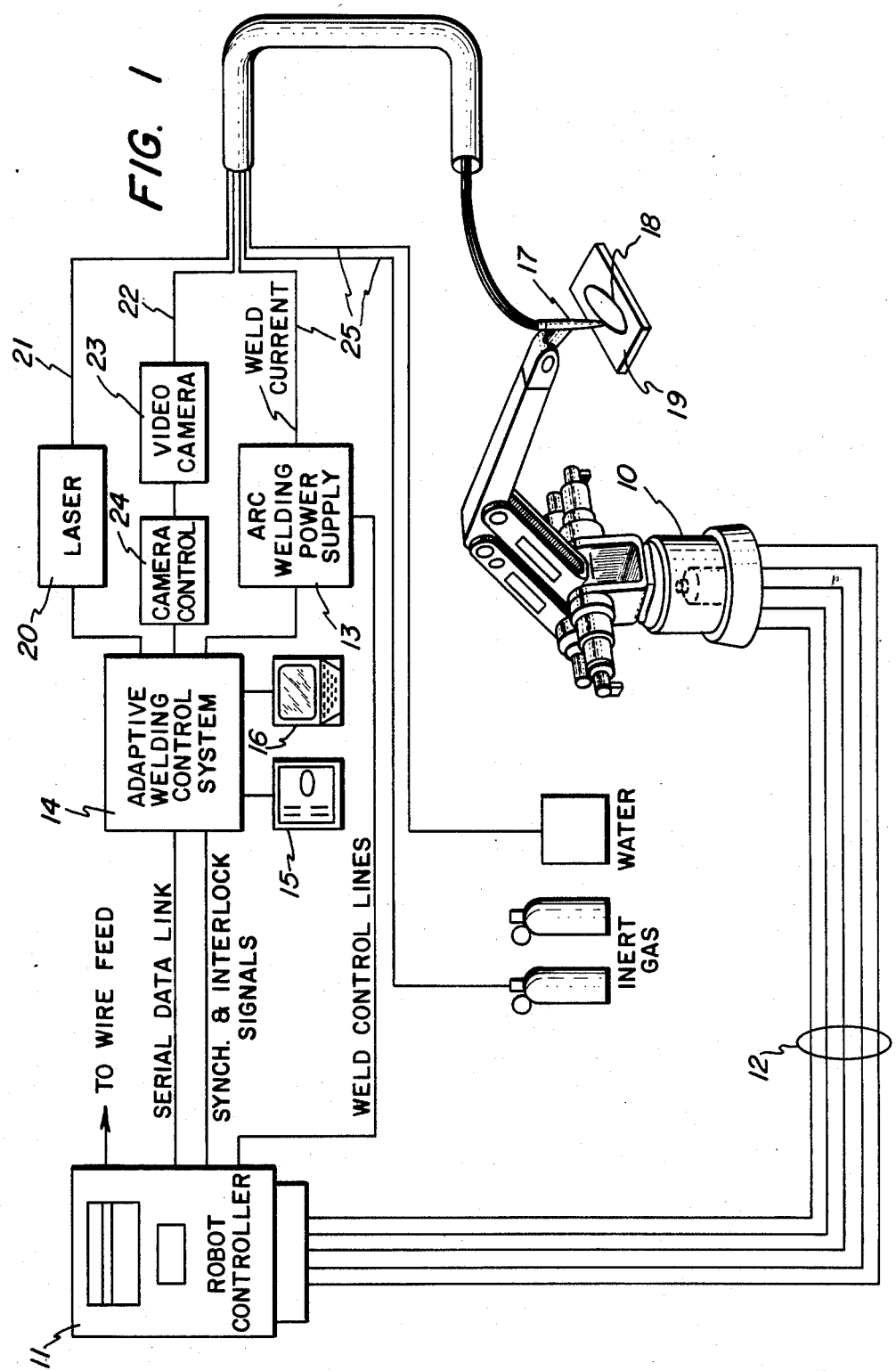
FIG. 1 is a block diagram of a closed-loop robotic arc welding system.

The closed-loop adaptive gas tungsten arc welding system in FIG. 1 is described in greater detail in "Closed-Loop Joint Tracking, Puddle Centering and Weld Process Control Using an Integrated Weld Torch Vision System", L. M. Sweet et al, Control of Manufacturing Processes and Robotic Systems, ed. by D. E. Hardt and W. J. Book, ASME, November 13–18, 1983, pp. 97–105, the disclosure of which is incorporated herein by reference. The components of the system include, briefly, a multiaxis robot 10 and robot controller 11 interconnected by joint control lines 12, a commercially available arc welding power supply 13, a microprocessor-based adaptive welding control system 14, a video monitor 15 to observe the weld puddle and seam, and a user terminal 16. The illustrated robot is General Electric's P50 robot, an industrial manipulator having 5 degrees of freedom and a mechanical structure that resembles a parallelogram.

The TIG welding torch 17 with an integrated through-torch vision sensor, and the complete vision system, was described above. This welding system automatically tracks the seam 18 in a workpiece 19 and does high quality, full penetration welding of the plates. A laser pattern generator projects a light pattern, such as two parallel stripes, on the metal surface in front of the torch electrode. The pattern is generated by low power laser beams from one or more lasers 20 and reaches the end of the torch after being transmitted through a coherent fiber optic bundle 21. The image of the weld puddle and seam tracking laser stripes passes along a second coherent fiber optic bundle 22 to a solid state camera 23 operated by camera controls 24. The weld seam image is analyzed in real time by the welding control system 14 to guide the torch and control the weld process. Supply lines 25 conduct electrical power and welding current, inert cover gas, and cooling water to the welding torch.

Figure 2:
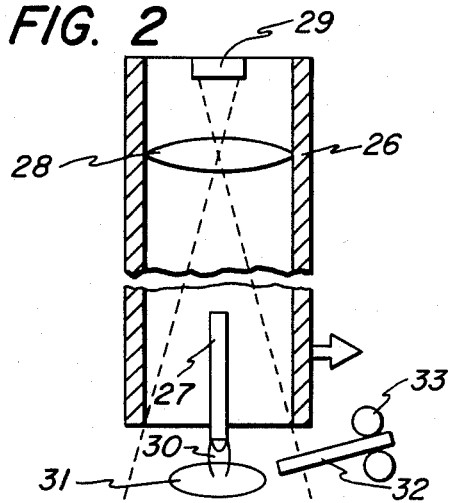
FIG. 2 shows schematically a TIG welding torch having integral puddle view optics and a filler wire feed.

FIG. 2 has a schematic representation of such a welding torch with integrated optics, and for more information refer to Pat. Nos. 4,488,032 and 4,491,719. The torch barrel and gas nozzle are indicated at 26 and the tungsten electrode at 27. The demagnified image of the weld puddle and weld region provided by an optical lens system 28 built into the torch assembly is focused onto the face of the fiber optic cable 29. The coherent bundle has ends of the individual fibers arranged in identical matrices at each bundle end, reproducing a two-dimensional image. Current for the welding process conducted by the electrode strikes an electric arc 30 between its end and the workpiece which supplies heat to create a molten weld puddle 31. This figure shows the filler wire 32 and wire feed mechanism 33 represented by two rollers to control its rate of feed. A commercially available wire feeder is attached to the welding torch 17 and to robot 10, controlled by commands from robot controller 11. In FIG. 2 the arrow indicates the direction of torch movement.

Figure 3:
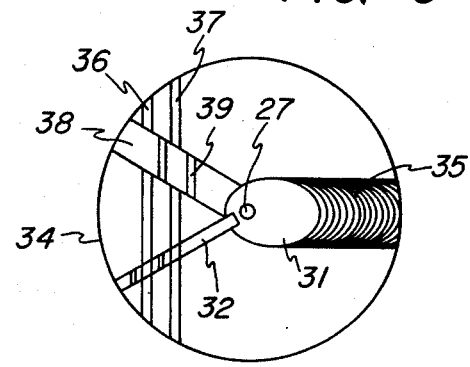
FIG. 3 illustrates features in the vision sensor image.

FIG. 3 is a schematic of features in the vision sensor image. The inner diameter of the torch nozzle is indicated at 34, with the electrode 27 at its center. The resolidified area 35 of the weld is at the trailing edge of the roughly oval-shaped molten weld puddle 31. The two parallel seam tracking laser stripes 36 and 37 have breaks produced by the workpiece joint 38; the two stripe segments 39 are displaced because of the height difference. The vision system determines the location of the breaks in the laser pattern, and the joint location data are combined with measurements of puddle position by the control system to determine the direction of torch motion. The remaining feature, other than the workpiece surface itself, is the filler wire 32 and two displaced laser stripe segments.

This invention is a multivariable feedback control system which is based on measuring the weld puddle area and maximum width for controlling the welding process in real time. Extensive analysis and testing has revealed that the weld pool area is the most sensitive discriminant to be measured for dynamic control of the TIG welding process.

Figure 4:
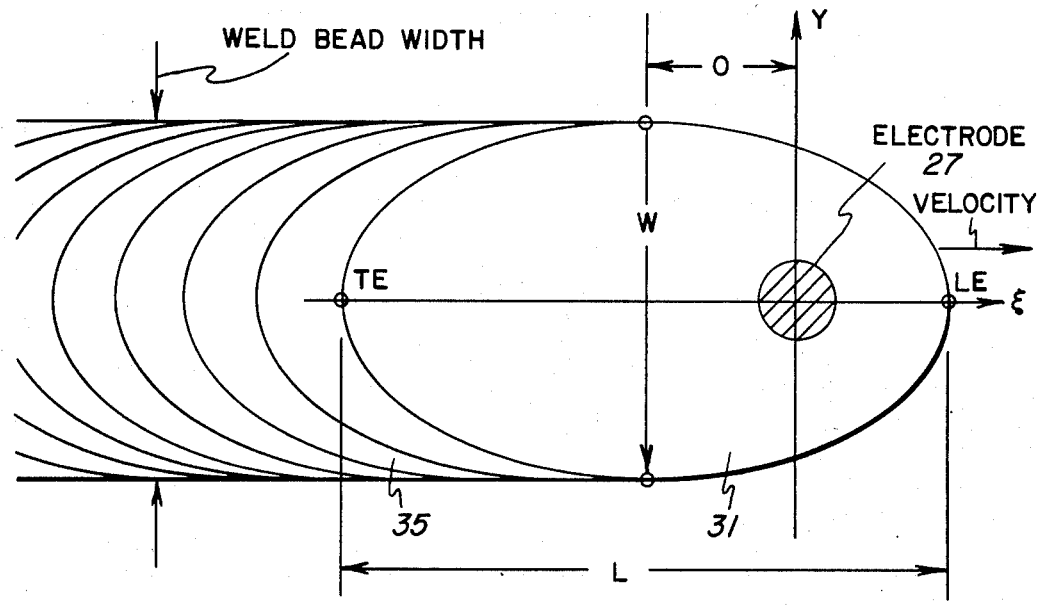
FIG. 4 shows a typical weld puddle geometry.

FIG. 4 schematically shows a typical weld pool geometry as observed from the moving coordinate system using a through-torch optical viewing system. The weld pool size and shape change when the welding process parameters, such as torch velocity, input power and filler wire velocity, are varied. The weld puddle maximum width (W) is located aft of the electrode position by the offset distance (0). Points (LE) and (TE) locate the leading and trailing edges of the liquid-solid interface when the torch velocity is directed along the positive ($\xi$) axis. The distance between the points (LE) and (TE) provide the weld puddle length (L). The aspect ratio (AR) of the weld pool is defined as the length (L) divided by the width (W). It has been determined by mathematical modeling and experiments that the aspect ratio (AR) is not as good a discriminate as either weld pool area or width to be sensed for control of the welding process. Furthermore, these analyses and experiments have shown that the weld puddle width (W) in combination with the surface area (A) of the weld puddle are the best discriminates to use in a TIG welding adaptive process control system. It was discovered that the weld pool area (A) was the most sensitive discriminate to variations in the welding process parameters. Accordingly, a control strategy based on using both the maximum weld puddle width (W) and area (A) together with the appropriate weighting functions has been devised.

Area gives more information than width and other puddle geometry parameters, to predict full penetration of the weld bead. The objective is class A quality welds with proper reinforcement and drop through. Reinforcement and drop through can be defined as the height of the weld bead from the top and bottom surface of the workpiece, respectively. For a class A quality weld the reinforcement and drop through by one definition is 0.143 multiplied by the workpiece thickness. The sensitivity and measurement accuracy of puddle area is much better than puddle width. Another reason for emphasizing area is that some process disturbances affect the area but do not change the width. One example is a heat sink such as a fixture; pool length changes but not its width, and therefore area changes. Another example is a tack weld, where the puddle size becomes small over a tack weld and can be effectively detected by puddle area measurements.

Weld pool geometry and penetration can be controlled by regulating heat input to the process. The heat input can be influenced by varying current or by varying torch travel velocity. However, weld current is a better control variable for puddle area and width regulation, since it has a more direct and predictable influence on the pool heat balance. The torch travel speed may be preprogrammed and need not be modified by the control system. For example, when welding along a tight curve, the torch can be programmed to travel at a slower speed, while the weld current can be controlled to regulate a combination of puddle area and width.

Figures 5, 8:
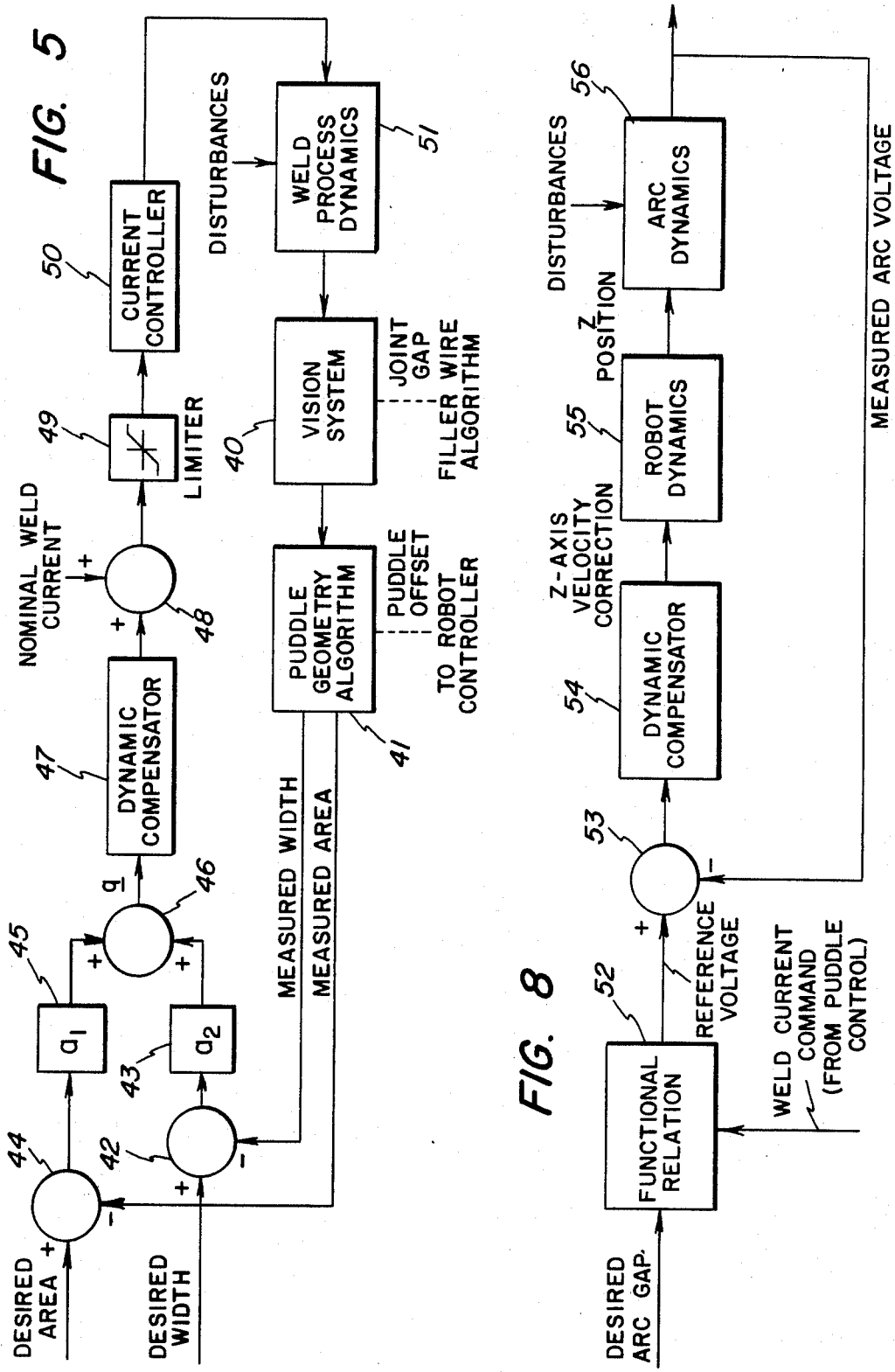
FIG. 5 is a block diagram of an arc welding control system based on weld puddle area and width measurements.
FIG. 8 is a block diagram of the arc length control.

A block diagram of the puddle geometry control system based on weld puddle area and maximum width measurements is shown in FIG. 5. The measurement subsystem along with a puddle geometry algorithm determines the puddle area and maximum width at discrete time intervals. The area and maximum width measurements are compared with the desired area and maximum width. An approximate measure of the puddle geometry error q is defined as $$q = a_1(A_d - A_m) + a_2(W_d - W_m)$$

where
$A_d$ = desired puddle area
$A_m$ = measured puddle area
$W_d$ = desired puddle width
$W_m$ = measured puddle width The weighting constants $a_1$ and $a_2$ can be selected based on the control objective. For example, $a_1 = 1$, and $a_2 = 0$ will regulate the puddle area. On the other hand, $a_1 = 0$ and $a_2 = 1$ will provide a control of the puddle width. By this invention the puddle geometry error is a predetermined proportion of the sum of the puddle area error and maximum width error. The contribution of each to the total error depends on such things as the set up of the component welded and the fixture.

In FIG. 5, which is a control system block diagram, the vision system 40 provides images of the weld pool to the adaptive welding control system 14 (FIG. 1) and the puddle geometry algorithm 41 determines measured maximum width and measured area. The difference between desired and measured widths is computed at 42 and multiplied by the preassigned constant $a_2$ at 43. Similarly, the difference between desired and measured areas is taken at 44 and multiplied by the weighting constant $a_1$ at 45. The puddle area and maximum width error terms are added at 46 and the result, the puddle geometry error q, is the input to a dynamic compensation algorithm.

The function of the dynamic compensator 47, typically a proportional, integral and derivative (PID) compensator, is to minimize the effects of process disturbances on the puddle geometry, stabilize the closed-loop system, and provide a robust dynamic performance. The output of the dynamic compensator is a function of the puddle geometry error and determines, at 48, a correction to the nominal welding current. The corrected welding current command is presented to a limiter 49 where it is clamped between upper and lower limits. Up to this point, the calculation of puddle geometry error, dynamic compensation, and limiting of the corrected welding current value are performed by the microprocessor-based adaptive welding control system 14 in FIG. 1. The welding current command is passed to the current controller 50 which is in the arc welding power supply 13. Block 51 represents a dynamic model of the molten pool in terms of gain and thermal time constant. The process disturbances, such as tack welds, heat sinks, filler wire feed rate changes, and undesirable puddle orientation are commented on later. In the closed-loop control, the heat input to the molten weld pool is directly influenced by the welding current. The vision system computes the weld puddle boundary, and the puddle geometry algorithm determines the puddle area and maximum width, and the feedback loop is closed. The torch travel speed is preprogrammed and is not modified by the control system.

Figure 6:
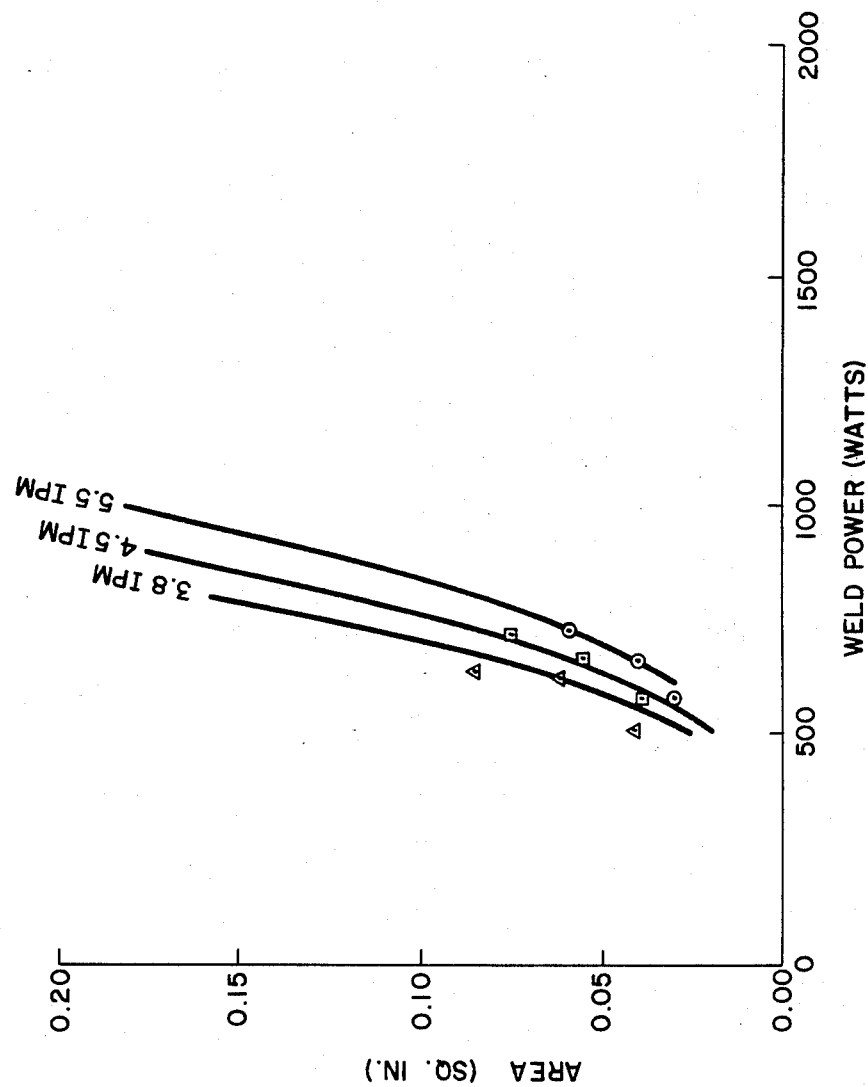

The curves in FIGS. 6 and 7 are a comparison of process model predictions with experimental data and have been used to design dynamic compensators in the adaptive feedback control system, and show how nominal welding current may be selected. A relationship between the puddle area and the electrical power input to the welding process, or weld power, for different travel speeds in inches per minute is given in FIG. 6. The results were obtained for 1/16 inch thick 304 SS (stainless steel) plates with zero joint gap. The solid curves are based on a mathematical, analytical model and the dots are results of welding experiments. The data for ⅛ inch thick 304 SS plates is given in FIG. 7. Similar relations have been determined for the puddle width. To arrive at nominal welding current, a given area on a curve yields the weld power. An arc voltage for a given arc length is known, and thus the welding current.

Changes in the filler wire feed rate and the robot motion affect the puddle boundary and are treated as random disturbances in the control system design. The vision system measures the width of the joint gap in real time and adjusts the filler wire rate, increasing wire velocity for large joint width and decreasing velocity if it narrows. The changes in filler wire velocity produce disturbances in puddle geometry and is compensated by feedback control. When welding around a sharp curve a lower value of the preprogrammed velocity is used. In this case pool area gets larger and its shape changes. The control system automatically compensates for this process disturbance.

FIG. 8 is a control system block diagram for an arc length control system. Arc length regulation is critical to the wire feed mechanism mounted on the welding torch (FIG. 2). The location of the wire feed in the molten pool can be controlled by maintaining a constant arc length. If arc length becomes too small, the wire feed mechanism can touch the workpiece and produce unacceptable weld quality. Further, a constant arc length minimizes disturbances in the puddle boundary. The arc voltage provides an indirect measurement of arc length and can be used to maintain a constant arc length. However, the arc current has a strong influence on the arc length. In this system, the arc voltage reference is modulated to reflect changes in the weld current. Block 52 indicates that a linear functional relationship from experimental data has been established between the arc gap, weld current, and the arc voltage. Knowing the desired arc gap and having the weld current command from the puddle geometry control (the output from current limiter 49), a reference voltage is established. The measured arc voltage, obtained from arc welding power supply 13, is compared with the reference arc voltage at 53 and the error sent to a dynamic compensator 54, such as a PID controller. The dynamic compensator computes Z-axis velocity corrections to the robot. For instance, if the error is positive, the robot (block 55) moves up to the new Z position and arc length increases. Block 56 shows that the arc dynamics are in the control loop. The presence of tack welds and tilt of the puddle surface in welding three-dimensional parts contributes disturbances in arc dynamics and can affect the arc length control. Summarizing, if welding current changes and arc length is to be kept constant, arc voltage is changed.

Other process disturbances that alter puddle geometry and require special considerations are as follows. The filler wire velocity is determined from the measurements of joint gap in real time. The wire feed rate depends on the width of the joint gap, torch velocity, material thickness, and wire diameter. The volume of wire injected into the weld puddle can be computed from a material balance equation to obtain a class A quality weld with proper reinforcement and drop through. The joint tracking sensor "sees" a tack weld as a very small or zero joint gap. The presence of tack welds or closing of the weld joint are compensated by a reduction in the wire feed rate. Another disturbance concerns puddle centering over the joint. In welding two pieces of unequal thickness, for example, welding a ⅛ inch thick plate with another 1/16 inch thick plate, the puddle may have an undesirable orientation. Further, the weld pool geometry and resultant bead may not be symmetric with respect to the workpiece joint. A lateral correction to the robot travel path is applied to compensate the width offset; this is illustrated in FIG. 5. A third disturbance is a heat sink during the welding operation which may perturb the puddle geometry. For the same welding current the puddle gets smaller because of the heat sink, and the control system responds by increasing weld current. After leaving the heat sink the puddle area is too large and the control responds by decreasing current. A severe heat sink during the welding operation may result in loss of puddle geometry vision data and will require changes in the weld fixture design.

Under some welding conditions, the method of closed-loop weld process control is practiced by regulating only puddle area to assure full penetration welding. Reviewing the method, the image is analyzed at discrete time intervals and puddle area is measured, a puddle geometry error is determined from the difference between desired and measured puddle areas, the puddle error is input to a dynamic compensator whose output determines the correction to nominal welding current, and the corrected welding current is fed to the welding torch to change the weld puddle boundaries and obtain full penetration weld beads. More commonly both the puddle area and the maximum puddle width are regulated by the control method. The vision-based arc welding robot control system is for non-autogeneous welding (with a wire feed as disclosed) as well as autogeneous welding without filler wire.

While the invention has been particularly shown and described with reference to preferred embodiments thereof, it will be understood by those skilled in the art that various changes in form and details may be made without departing from the spirit and scope of the invention.

What is claimed is:

1. A vision-based robotic welding system comprising:
    an arc welding torch having an electrode to conduct welding current and create a molten weld puddle in a workpiece by the heat of an electric arc, and integrated optics to provide an image of the weld puddle and workpiece joint; and
    an improved adaptive feedback control system to control weld quality during the welding operation and assure full penetration weld beads, which is comprised of:
    means to analyze said image and measure puddle area and maximum width at discrete intervals;
    means to determine a puddle geometry error by comparing the area and width measurements with desired puddle area and width;
    means to correct the nominal welding current in dependence upon said puddle geometry error; and
    means for feeding corrected welding current to said welding torch to thereby change the heat input and weld puddle boundaries.

2. The welding system of claim 1 wherein said current correction means includes a dynamic compensator, to minimize the effects of process disturbances on puddle geometry and to stabilize the closed-loop system, to which said puddle error is input.

3. The welding system of claim 2 and a limiter to clamp said corrected welding current between upper and lower limits.

4. The welding system of claim 1 wherein said puddle geometry error determining means comprises deriving the difference between desired and measured puddle area and between desired and measured puddle width, multiplying each difference by a constant selected based on the control objective, and summing the results.

5. The welding system of claim 1 and arc length control means to maintain a constant arc length by varying arc voltage as welding current changes.

6. A vision-based robotic welding system comprising:
    a tungsten-inert gas welding torch which strikes an electric arc between its electrode and a workpiece and supplies heat to create a molten weld puddle, said torch having an integral optical system to image the weld puddle and workpiece joint, and a filler wire feed mechanism;
    a multiaxis robot supporting said torch;
    an improved adaptive feedback control system based on weld puddle area and width regulation to control the welding process in real time and assure full penetration welds, while compensating for process disturbances;
    said adaptive control system including means to analyze said image and measure weld puddle area and maximum width at discrete time intervals;
    means to determine a puddle geometry error from the difference between desired and measured puddle area and between desired and measured puddle maximum width, and preassigned weighting constants;
    means for inputting said puddle geometry error to a dynamic compensator and determining a correction to the preset nominal welding current to change the weld puddle boundaries; and
    arc length control means to maintain a constant arc length by modulating arc voltage to reflect changes in welding current applied to said welding torch.

7. The welding system of claim 6 wherein said arc welding torch has a second integral optical system to project a structured light pattern onto said workpiece joint close to said weld puddle which is imaged and analyzed to determine joint location and width.

8. The welding system of claim 7 wherein said process disturbances compensated by said adaptive feedback control system include changes in filler wire feed rate, robot velocity changes, variations in joint width and tack welds, and heat sinks.

9. In a robotic welding operation wherein welding current conducted by the nonconsumable electrode of a welding torch generates an electric arc whose heat forms a molten weld puddle in a workpiece, and a vision system integrated with said torch provides an image of said weld puddle and the workpiece joint to guide the torch and control the welding process, the improved method of closed-loop weld process control comprising the steps of:

analyzing said image at discrete time intervals and measuring weld puddle area;

determining a puddle geometry error from the difference between desired and measured puddle areas;

inputting said puddle geometry error to a dynamic compensator whose output determines a correction to nominal welding current; and feeding said corrected welding current to said torch to change the weld puddle boundaries and regulate puddle area to assure full penetration weld beads.

10. The method of claim 9 and the steps of measuring weld puddle maximum width at said discrete time intervals, determining said puddle geometry error as a predetermined proportion of the sum of the difference between desired and measured puddle area and the difference between desired and measured puddle width, and regulating a combination of puddle area and width to assure full penetration welds.

11. The method of claim 10 and maintaining a constant length arc by modulating arc voltage to reflect changes in said welding current.

12. The method of claim 10 wherein the closed-loop control automatically compensates for welding process disturbances such as variations in joint width, robot velocity changes, tack welds, and changes in filler wire feed rate.

* * * * *